US009194997B2

(12) United States Patent
Cha et al.

(10) Patent No.: US 9,194,997 B2
(45) Date of Patent: Nov. 24, 2015

(54) BACKLIGHT UNIT AND 2D AND 3D IMAGE DISPLAY SYSTEM

(75) Inventors: Kyung-hoon Cha, Yongin-si (KR); Sergey Shestak, Suwon-si (KR); Ki-hyung Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 848 days.

(21) Appl. No.: 13/197,382

(22) Filed: Aug. 3, 2011

(65) Prior Publication Data

US 2012/0032997 A1 Feb. 9, 2012

(30) Foreign Application Priority Data

Aug. 4, 2010 (KR) ........................ 10-2010-0075313

(51) Int. Cl.

| | |
|---|---|
| ***G02B 27/22*** | (2006.01) |
| ***G02B 6/00*** | (2006.01) |
| ***G02F 1/1335*** | (2006.01) |
| ***F21V 8/00*** | (2006.01) |
| ***H04N 13/04*** | (2006.01) |

(52) U.S. Cl.

CPC .......... *G02B 6/0076* (2013.01); *H04N 13/0404* (2013.01); *H04N 13/0418* (2013.01); *G02B 6/0036* (2013.01); *G02B 6/0038* (2013.01); *G02B 6/0043* (2013.01); *G02B 6/0053* (2013.01)

(58) Field of Classification Search

CPC ... G09G 3/3406; G09G 3/3413; G09G 3/342; G09G 3/3426; G09G 1/06; G09G 5/10; G09G 5/02; G09F 13/04; G03B 21/26; G02B 27/10; G02B 27/22; G02B 26/08; G02B 5/02; G02B 27/00; G02B 27/12; G02B 27/26; G02B 6/00; G02B 6/10; G02B 6/12; G02B 3/08; G02F 1/13357; G02F 1/1335; H04N 13/00; H04N 13/04; H01J 9/20; H05B 37/02; G01D 11/28

See application file for complete search history.

(56) References Cited

U.S. PATENT DOCUMENTS

| | | | | |
|---|---|---|---|---|
| 5,897,184 | A * | 4/1999 | Eichenlaub et al. | 349/64 |
| 7,201,836 | B2 | 4/2007 | Vogel et al. | |
| 2003/0063234 | A1 * | 4/2003 | Oda et al. | 349/65 |
| 2005/0046951 | A1 * | 3/2005 | Sugihara et al. | 359/619 |
| 2008/0204871 | A1 * | 8/2008 | Mather et al. | 359/462 |
| 2008/0316596 | A1 | 12/2008 | Cha et al. | |
| 2010/0026703 | A1 * | 2/2010 | Parker et al. | 345/589 |
| 2010/0220260 | A1 * | 9/2010 | Sugita et al. | 349/62 |

FOREIGN PATENT DOCUMENTS

| | | |
|---|---|---|
| JP | 2006-010935 A | 1/2006 |

* cited by examiner

*Primary Examiner* — Aneeta Yodichkas
*Assistant Examiner* — Nguyen H Truong
(74) *Attorney, Agent, or Firm* — Sughrue Mion, PLLC

(57) ABSTRACT

A backlight unit and a two-dimensional (2D) and three-dimensional (3D) image display system including the same. The backlight unit includes a first light guide plate and a second light guide plate, wherein the first light guide plate includes a plurality of first diffusion units that are aligned to be spaced apart from each other, and the second light guide plate includes a plurality of second diffusion units that are aligned alternately with the first diffusion units. Thus, an emission direction of light is controlled, so that a 3D image may be displayed in a plurality of viewing zones.

24 Claims, 13 Drawing Sheets

BACKLIGHT UNIT AND 2D AND 3D IMAGE DISPLAY SYSTEM

CROSS-REFERENCE TO RELATED PATENT APPLICATION

This application claims priority from Korean Patent Application No. 10-2010-0075313, filed on Aug. 4, 2010 in the Korean Intellectual Property Office, the disclosure of which is incorporated herein in its entirety by reference.

BACKGROUND

1. Field

Apparatuses and systems consistent with exemplary embodiments relate to a backlight unit and a two-dimensional (2D) and three-dimensional (3D) image display system including the same.

2. Description of the Related Art

In general, 3D images are generated by the principle of stereo vision of both eyes. Since both eyes are separated about 65 mm from each other, binocular parallax occurs as the most important factor in a stereoscopic feeling. 3D image displays generally include 3D image displays requiring glasses and 3D image displays not requiring glasses. 3D image displays not requiring glasses obtain 3D images by separating right and left images from each other. 3D image displays not requiring glasses use a parallax barrier method or a lenticular method.

In the parallax barrier method, images to be observed by the right and left eyes are alternately printed or developed as a photo having longitudinal patterns and are observed using a very thin longitudinal lattice row, e.g., a barrier. In this way, a longitudinal pattern image observed by a left eye and a longitudinal pattern image observed by a right eye are divided by the barrier into parts, and images having different view points are observed by the right and left eyes as a stereoscopic image.

In the lenticular method, images corresponding to the right and left eyes are disposed on a focusing surface of a lenticular lens and are observed using the lenticular lens, and then the images are divided according to the right and left eyes according to the characteristics of the lenticular lens so that a stereoscopic image can be formed. The lenticular method has a higher light efficiency than the parallax barrier method. On the other hand, since lenticular lenses are disposed at the front of a display device, external light is reflected, thereby reducing a contrast ratio.

In addition, a narrow viewing zone is formed by the parallax barrier method and the lenticular method, and thus only one person can watch an image at the center of the image.

SUMMARY

Exemplary embodiments provide a backlight unit capable of displaying 3D images in a plurality of viewing zones and a two-dimensional and three-dimensional image display system including the same.

According to an aspect of an exemplary embodiment, there is provided a backlight unit including: a first light guide plate; a first light source that is disposed at one side of the first light guide plate and emits light to the first light guide plate; a second light guide plate that is disposed on the first light guide plate; a second light source that is disposed at one side of the second light guide plate and emits light to the second light guide plate; a plurality of first diffusion units that are aligned in the first light guide plate to be spaced apart from each other in a widthwise direction of the first light guide plate; a plurality of second diffusion units that are aligned in the second light guide plate alternately with the first diffusion unit in the widthwise direction of the second light guide plate; and a lenticular lens array that is disposed on the second light guide plate.

The first diffusion units and the second diffusion units may respectively include one selected from the group consisting of a prism pattern, a diffusion film, and a dot pattern.

A sum of a pitch of one of the first diffusion units and a pitch of one of the second diffusion units may be the same as or less than a pitch of the lenticular lens array.

The first light source may be disposed at the one side of the first light guide plate in the lengthwise direction of the first light guide plate, and the second light source may be disposed at the one side of the second light guide plate in the lengthwise direction of the second light guide plate.

The first diffusion units and the second diffusion units may have a prism pattern aligned in the lengthwise direction.

The first light source and the second light source may be respectively driven in synchronization with a left-eye image signal and a right-eye image signal.

The first light source may be disposed at the one side of the first light guide plate in the widthwise direction, and the second light source may be disposed at the one side of the second light guide plate in the widthwise direction of the second light guide plate.

The first diffusion units and the second diffusion units may respectively have a prism pattern aligned in the widthwise direction.

The backlight unit may further include a switch controller that selectively switches the first light source and the second light source.

A reflection plate may be further disposed below the second diffusion unit.

A medium that has a refractive index less than that of the first light guide plate and the second light guide plate may be interposed between the first light guide plate and the second light guide plate.

The lenticular lens array and the second light guide plate may be integrally formed.

The backlight unit may further include a brightness enhancement film between the second light guide plate and the lenticular lens array to diffuse light in the lengthwise direction.

According to an aspect of another exemplary embodiment, there is provided a 2D and 3D image display system including a backlight unit and a display panel that forms an image using light emitted from the backlight unit, wherein the backlight unit includes: a first light guide plate; a first light source that is disposed at one side of the first light guide plate and emits light to the first light guide plate; a second light guide plate that is disposed on the first light guide plate; a second light source that is disposed at one side of the second light guide plate and emits light to the second light guide plate; a plurality of first diffusion units that are aligned in the first light guide plate to be spaced apart from each other in a widthwise direction of the first light guide plate; a plurality of second diffusion units that are aligned in the second light guide plate alternately with the first diffusion unit in the widthwise direction of the second light guide plate; and a lenticular lens array that is disposed on the second light guide plate.

The first diffusion units and the second diffusion units may include one selected from the group consisting of a prism pattern, a diffusion film, and a dot pattern.

On-off of the first light source and the second light source may be controlled by regions in synchronization with the scanning of the display panel.

BRIEF DESCRIPTION OF THE DRAWINGS

The above and/or other aspects will become more apparent by describing in detail exemplary embodiments with reference to the attached drawings in which.

DETAILED DESCRIPTION

Figure 1:
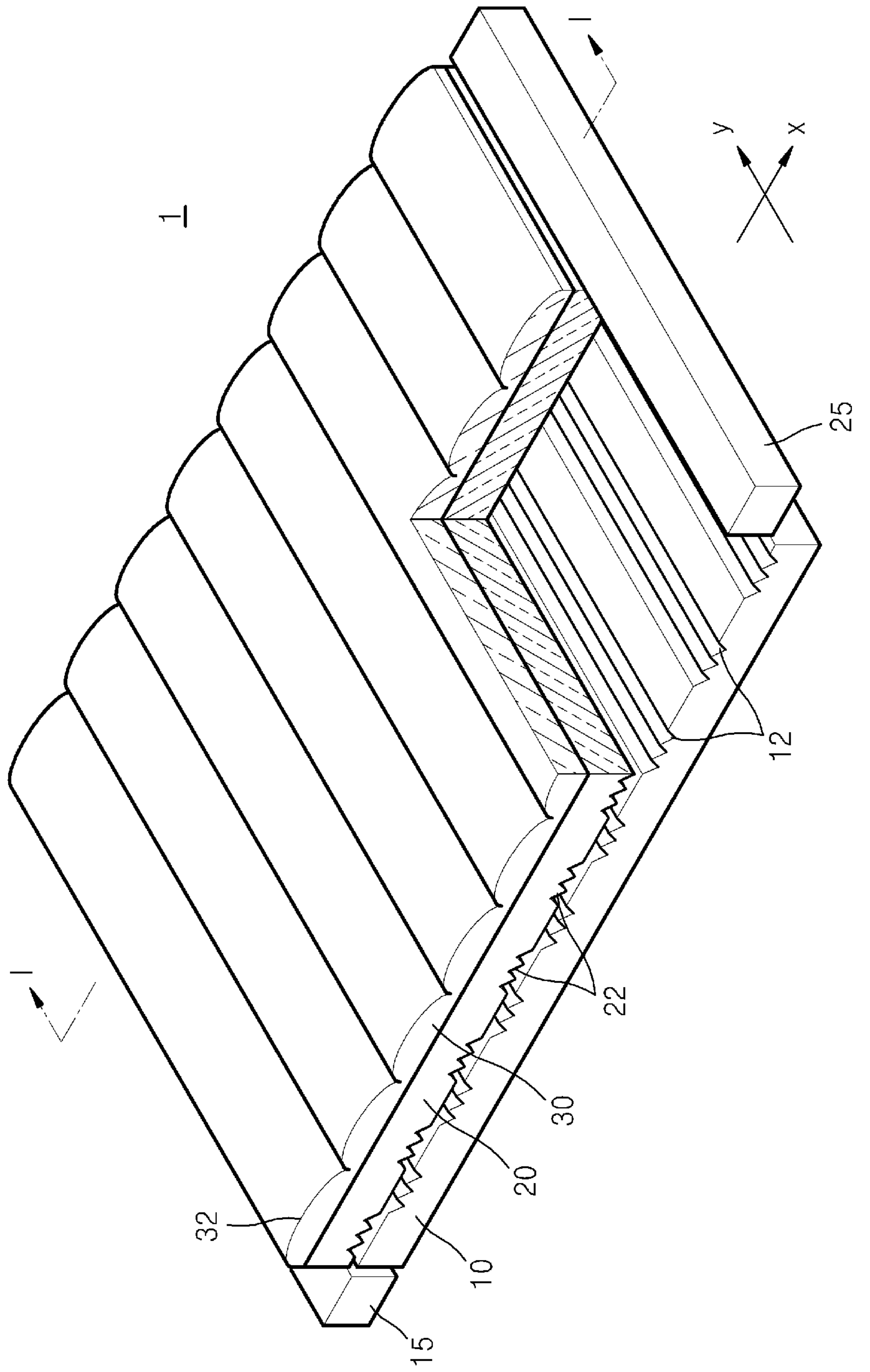
FIG. 1 is a partial perspective view of a backlight unit according to an exemplary embodiment.

Hereinafter, a backlight unit and a 2D and 3D image display system including the same according to an exemplary embodiment will now be described more fully with reference to the accompanying drawings, in which exemplary embodiments are shown. In the drawings, the same reference numerals refer to the same constitutional elements throughout the drawings, and the thickness or the size of each component is exaggerated for convenience and clarity. The exemplary embodiments are provided to fully describe the inventive concept, and the exemplary embodiments as described below can be modified in various forms.

A backlight unit according to an exemplary embodiment includes two light guide plates that respectively transmit light to a plurality of viewing zones.

Figure 2:
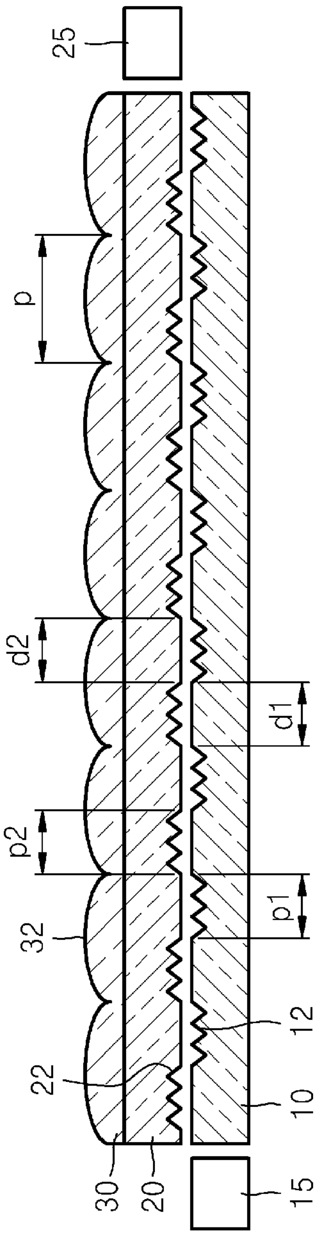
FIG. 2 is a cross-sectional view taken along line I-I of FIG. 1.

FIG. 1 is a partial perspective view of a backlight unit 1 according to an exemplary embodiment. FIG. 2 is a cross-sectional view taken along line I-I of FIG. 1.

The backlight unit 1 includes a first light guide plate 10 and a second light guide plate 20, wherein a first light source 15 is disposed at least one side of the first light guide plate 10 and a second light source 25 is disposed at at least one side of the second light guide plate 20.

The first light guide plate 10 may include a plurality of first diffusion units 12 that diffuse light emitted from the first light source 15. Referring to FIG. 2, the first diffusion units 12 may be spaced apart from each other by a first distance d1. The first diffusion units 12 may be aligned along a widthwise direction of the backlight unit 1. In this regard, the widthwise direction indicates a long-axis direction (x-direction) of the backlight unit 1 and a lengthwise direction indicates a short-axis direction (y-direction) of the backlight unit 1. For example, if a screen has an aspect ratio of 4:3 or 16:9, a long-side direction may be regarded as a widthwise direction, and a short-side direction may be regarded as a lengthwise direction. The first light source 15 may be disposed at least one side of the first light guide plate 10 in the lengthwise direction. The second light source 25 may be disposed at least one side of the second light guide plate 20 in the lengthwise direction. The first light source 15 and the second light source 25 may be a point light source, a linear light source, or a surface light source. For example, the first light source 15 and the second light source 25 may include a cool cathode fluorescent lamp (CCFL) or a light-emitting diode (LED), but are not limited thereto.

The second light guide plate 20 may include a plurality of second diffusion units 22 that diffuse light emitted from the second light source 25. The second diffusion units 22 may be aligned to be spaced apart from each other in a widthwise direction of the backlight unit 1 by a second distance d2. The first distance d1 may be the same as the second distance d2. The first diffusion units 12 and the second diffusion units 22 may be alternately aligned.

A lenticular lens array 30 in which lenticular lenses 32 are aligned in the widthwise direction may be disposed on the second light guide plate 20. A pitch p of the lenticular lens 32 may be the same as or greater than the sum of a first pitch p1 of one of the first diffusion units 12 and a second pitch p2 of one of the second diffusion units 22. The lenticular lens array 30 may be separately formed or integrally formed with the second light guide plate 20.

The first diffusion units 12 and the second diffusion units 22 may include at least one selected from the group consisting of a prism pattern, a dot pattern, and a diffusion film, but are not limited thereto. The first diffusion units 12 and the second diffusion units 22 may have the same pattern. Alternatively, the first diffusion units 12 and the second diffusion units 22 may include a combination of the prism pattern, the dot pattern, and the diffusion film. FIGS. 1 and 2 show the first diffusion units 12 and the second diffusion units 22 having a prism pattern. The prism pattern may include V-shaped grooves. As shown in FIG. 1, if the first light source 15 and the second light source 25 are aligned in the lengthwise direction (y-direction) of the backlight unit 1, the V-shaped grooves of the prism pattern may be formed in the lengthwise direction (y-direction) of the backlight unit 1.

Figure 3A:
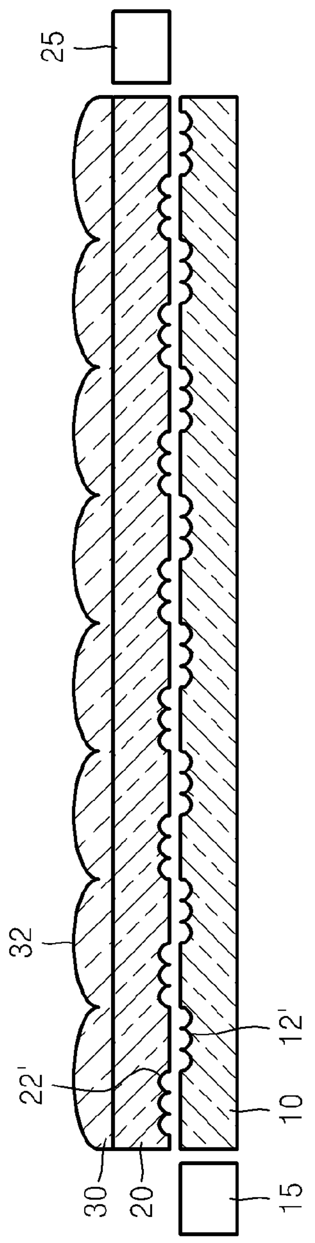
FIGS. 3A and 3B illustrate a diffusion unit of a backlight unit according to an exemplary embodiment.
Figure 3B:
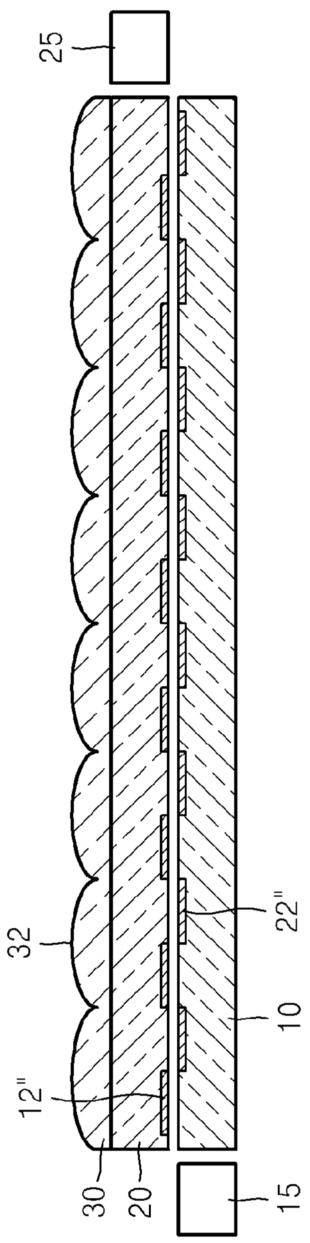

FIG. 3A illustrates first diffusion units 12' and second diffusion units 22' which have a dot pattern, and FIG. 3B illustrates first diffusion units 12" and second diffusion units 22" which have a diffusion film.

Hereinafter, an operation of displaying a 3D image using the backlight unit 1 shown in FIG. 1 will be described.

Figure 4A:
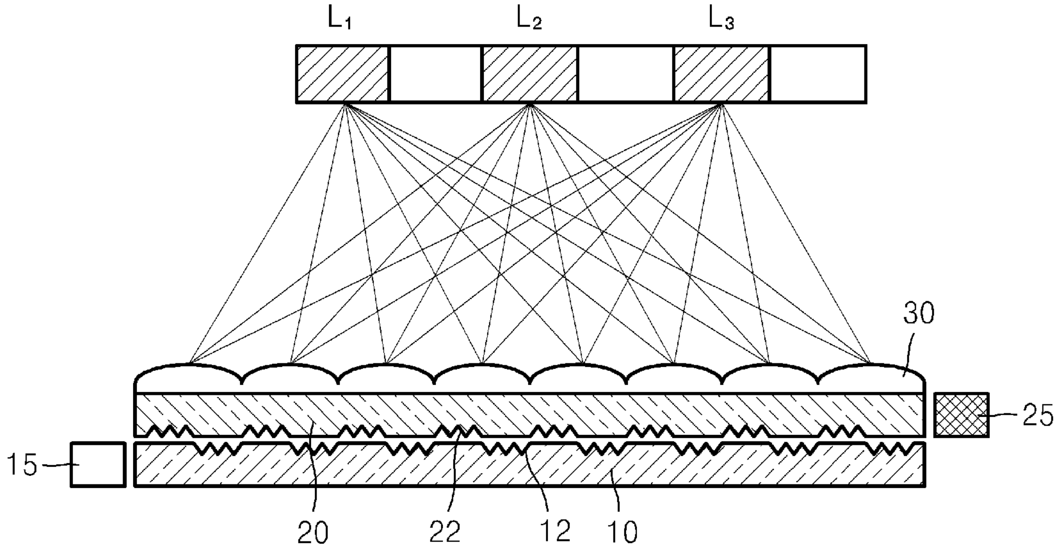
FIGS. 4A and 4B are diagrams for describing an operation of displaying a 3D image using a backlight unit, according to another exemplary embodiment.

Referring to FIG. 4A, when the first light source 15 is turned on, and the second light source 25 is turned off, light emitted from the first light source 15 proceeds through the first light guide plate 10. The light proceeding through the first light guide plate 10 is diffused by the first diffusion units 12 to be emitted via the second light guide plate 20 and the lenticular lens array 30. In a region where the first diffusion units 12 are not formed, light that is totally reflected and proceeds through the first light guide plate 10 may be emitted by the first diffusion units 12. In the region where the first diffusion units 12 are not formed, a small amount of light that is not totally reflected may be externally emitted, but this may not be considered.

An emission direction of light may be controlled by the first diffusion units 12, and light may be collimated by the lenticular lens array 30 to form, for example, a plurality of left-eye viewing zones. For example, a first left-eye viewing zone L1, a second left-eye viewing zone L2, and a third left-eye viewing zone L3 may be formed as shown in FIG. 4A.

Figure 4B:
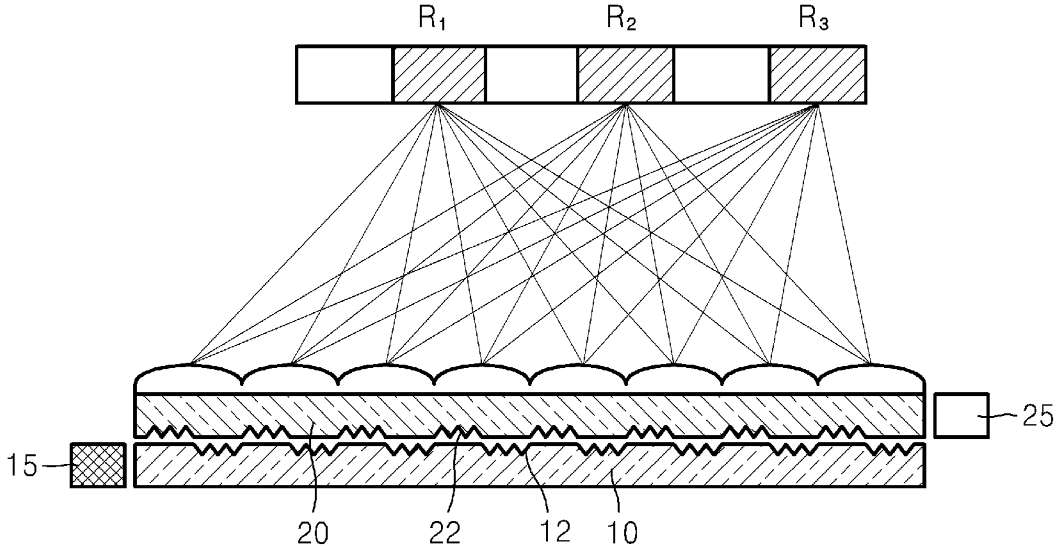

Referring to FIG. 4B, when the first light source 15 is turned off, and the second light source 25 is turned on, light emitted from the second light source 25 proceeds through the second light guide plate 20. Light proceeding through the second light guide plate 20 is diffused by the second diffusion units 22 to be externally emitted via the lenticular lens array 30. In a region where the second diffusion units 22 are not formed, light that is totally reflected and proceeds through the second light guide plate 20 may be externally emitted by the second diffusion units 22. The emission direction of light may be controlled by the second diffusion units 22. Since the position of the second diffusion units 22 is different from that of the first diffusion units 12, the emission direction of light by the second diffusion units 22 may be different from that by the first diffusion units 12. For example, a plurality of right-eye viewing zones may be formed by the second diffusion units 22. For example, a first right-eye viewing zone R1, a second right-eye viewing zone R2, and a third right-eye viewing zone R3 may be formed as shown in FIG. 4B.

A plurality of 3D image viewing zones may be formed by the combination of the plurality of left-eye viewing zones shown in FIG. 4A and the plurality of right-eye viewing zones shown in FIG. 4B. A 3D image may be displayed by the combination of the backlight unit 1 shown in FIG. 1 and a display panel (not shown) forming an image.

Figure 5:
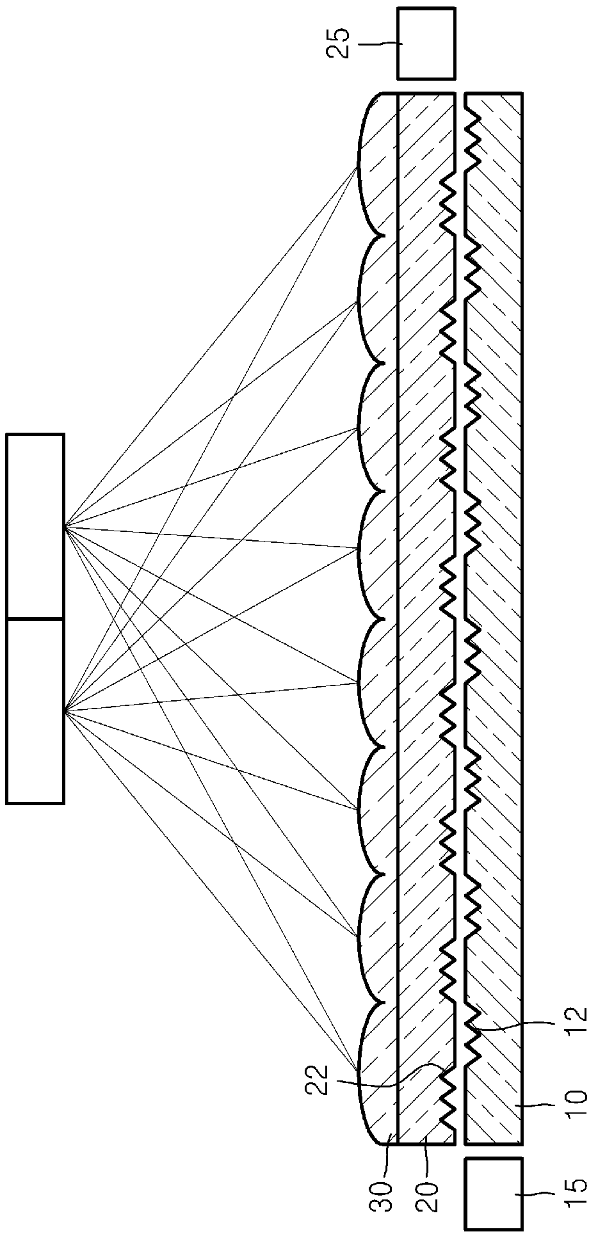
FIG. 5 illustrates an operation of displaying a 2D image using a backlight unit according to an exemplary embodiment.

FIG. 5 shows that both the first light source 15 and the second light source 25 are turned on. In this case, the same image is displayed in all regions, so that a 2D image may be displayed. As described above, the first light source 15 and the second light source 25 are selectively switched, so that the 2D and 3D images may be displayed and the 3D image may be displayed in a plurality of viewing zones. Since the 3D image is displayed in the plurality of viewing zones, many people may watch the 3D image.

Figure 6:
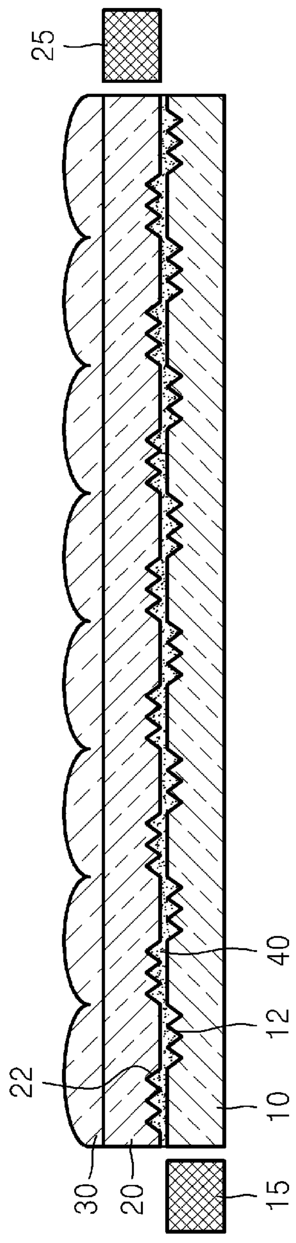
FIGS. 6 and 7 illustrate a backlight unit according to another exemplary embodiment.

Also, a medium 40 may be interposed between the first light guide plate 10 and the second light guide plate 20 as shown in FIG. 6. The medium 40 may have a refractive index that is less than that of the first light guide plate 10 and the second light guide plate 20. Accordingly, light proceeding through the first light guide plate 10 and the second light guide plate 20 is totally reflected, so that the amount of light that is emitted in an undesired direction may be reduced.

Figure 7:
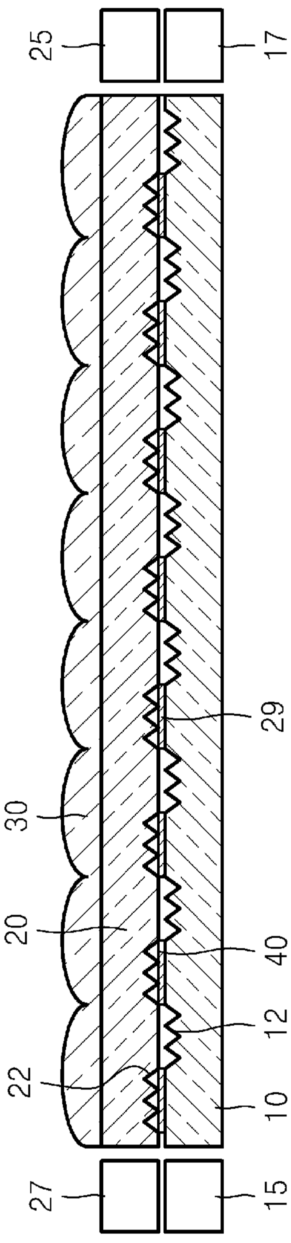

FIG. 7 illustrates a modified exemplary embodiment of the backlight unit 1 of FIG. 1. The backlight unit of FIG. 7 includes a first light source 15 and a third light source 17 at both sides of the first light guide plate 10, and a second light source 25 and a fourth light source 27 at both sides of the second light guide plate 20. The brightness of an image may be improved by using two light sources. If the first light source 15 and the third light source 17 are turned on, and the second light source 25 and the fourth light source 27 are turned off, a plurality of left-eye viewing zones may be formed. If the first light source 15 and the third light source 17 are turned off, and the second light source 25 and the fourth light source 27 are turned on, a plurality of right-eye viewing zones may be formed.

A reflection plate 29 may further be formed below each one of the second diffusion units 22. The reflection plate 29 prevents light proceeding through the second light guide plate 20 from being transmitted toward the first light guide plate 10 to increase an effective amount of light.

Figure 8:
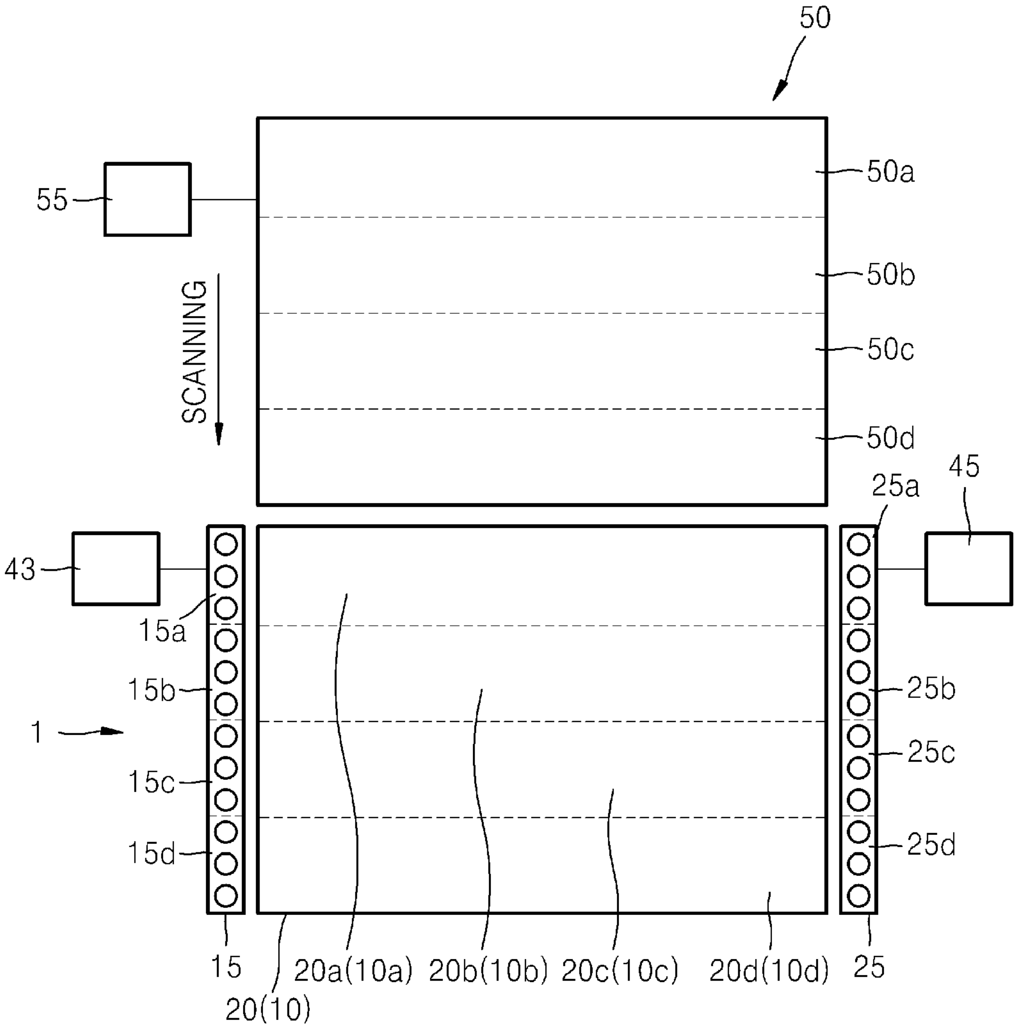
FIG. 8 is a diagram for describing an operation of a backlight unit and a display panel, according to an exemplary embodiment.

FIG. 8 separately illustrates a backlight unit 1 and a display panel 50 to describe operations of the backlight unit 1 and the display panel 50. A lenticular lens array and first and second diffusion units are not shown in the backlight unit 1 for convenience's sake, and the first light guide plate 10 and the second light guide plate 20 may be divided into a plurality of regions. For example, the first light guide plate 10 and the second light guide plate 20 may respectively include first regions 10*a* and 20*a*, second regions 10*b* and 20*b*, third regions 10*c* and 20*c*, and fourth regions 10*d* and 20*d*. For example, the first light source 15 may include a plurality of light source regions, namely, first to fourth light source regions 15*a*, 15*b*, 15*c*, and 15*d* which correspond to the first to fourth regions 10*a*, 10*b*, 10*c*, and 10*d* of the first light guide plate 10. The first to fourth regions 10*a*, 10*b*, 10*c*, and 10*d* of the first light source 10 may include a light emitting diode (LED) or a cold cathode fluorescent lamp (CCFL). A switching of each of the light sources of the light source regions may be independently controlled. The second light source 25 may also include fifth to eighth light source regions 25*a*, 25*b*, 25*c*, and 25*d* which correspond to the first to fourth regions 20*a*, 20*b*, 20*c*, and 20*d* of the second light guide plate 20. The fifth to eighth regions 20*a*, 20*b*, 20*c*, and 20*d* of the second light source 20 may include an LED or CCFL, and a switching of each of the light sources of the light source regions may be independently controlled.

The first light source 15 may be turned on and off by a first switch controller 43, and the second light source 25 may be turned on and off by a second switch controller 45. The display panel 50 may display an image according to an image signal that is input by an image signal input unit 55. The image signal input unit 55 may scan the image signal in a lengthwise direction of the display panel 50. The first light source 15 and the second light source 25 may respectively be driven in synchronization with a left-eye image signal and a right-eye image signal.

Also, the display panel 50 may include first to fourth panel regions 50*a*, 50*b*, 50*c*, and 50*d* which correspond to the first to fourth regions 10*a*, 20*a*, 10*b*, 20*b*, 10*c*, 20*c*, 10*d*, and 20*d* of the first light guide plate 10 and the second light guide plate 20. The first and second switch controllers 43 and 45 may control on-off of the first light source 15 and the second light source 25 in synchronization with the scanning of the display panel 50. For example, when a left-eye image signal is scanned to the first to fourth panel regions 50*a*, 50*b*, 50*c*, and 50*d*, the first light source 15 of the first to fourth light source regions 15*a*, 15*b*, 15*c*, and 15*d* may be turned on. Then, when a right-eye image signal is scanned to the first panel region 50*a*, and a left-eye image signal is scanned to the second to fourth panel regions 50*b*, 50*c*, and 50*d*, the second light source 25 of the fifth light source region 25*a* is turned on and the second light source 25 of the sixth to eighth light source regions 25*b*, 25*c*, and 25*d* is turned off to emit light to the first region 20*a* of the second light guide plate 20 corresponding to the first panel region 50. The first light source 15 of the first light source region 15*a* is turned off, and the first light source 15 of the second to fourth light source regions 15*b*, 15*c*, and 15*d* is turned on to emit light to the second to third regions 10*b*, 10*c*, and 10*d* of the first light guide plate 10 corresponding to the second to fourth panel regions 50*b*, 50*c*, and 50*d*. As such, the first light source 15 and the second light source 25 are turned on and off by regions in synchronization with the scanning of the display panel so that cross-talk between the left eye image and the right eye image may be reduced.

Figure 9:
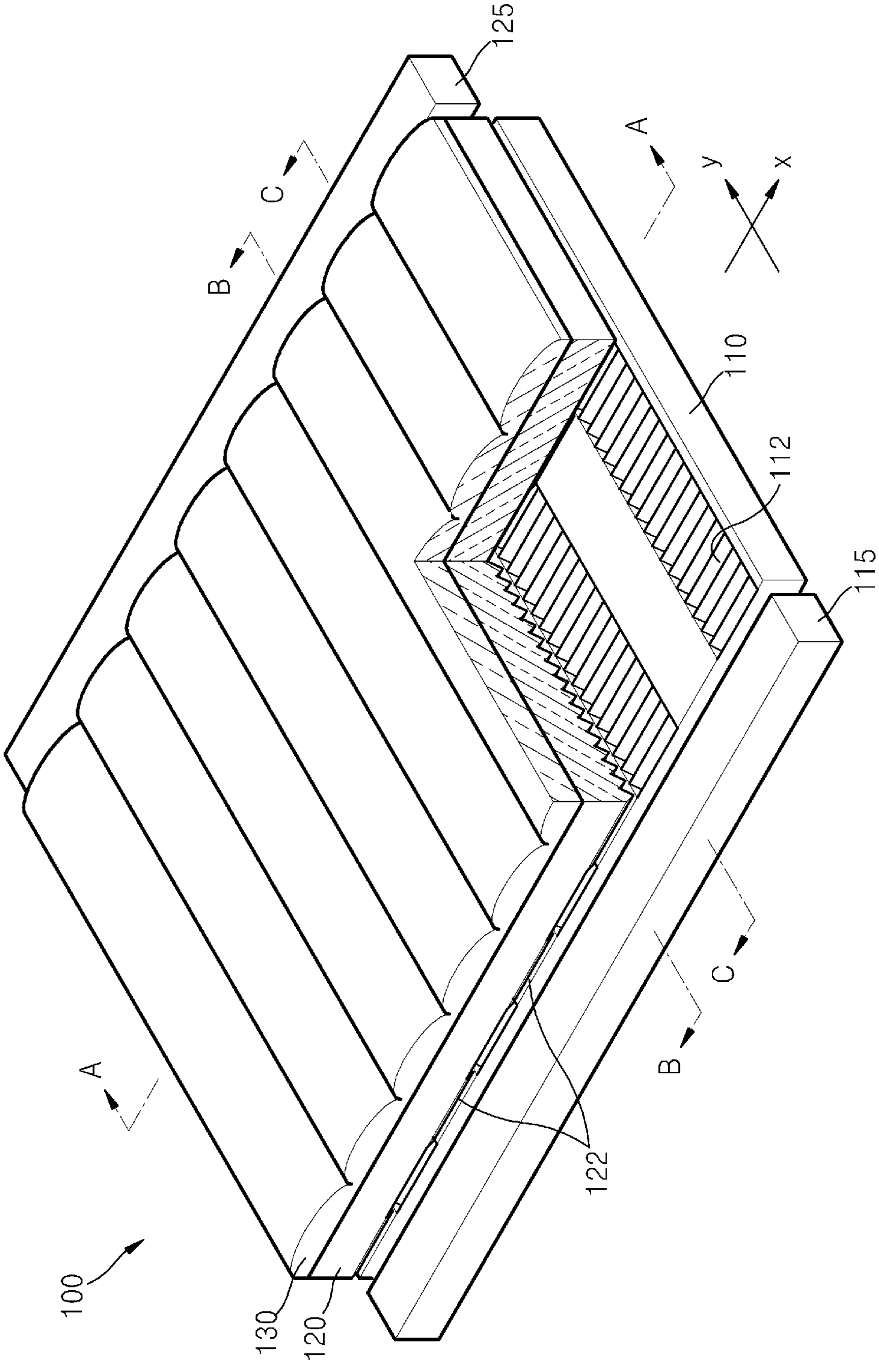
FIG. 9 is a cutaway perspective view of a backlight unit according to another exemplary embodiment.

FIG. 9 is a cutaway perspective view of a backlight unit 100 according to another exemplary embodiment. The backlight unit 100 includes a first light guide plate 110 and a second light guide plate 120, wherein a first light source 115 is disposed at least one side of the first light guide plate 110 and a second light source 125 is disposed at least one side of the second light guide plate 120.

Figure 10A:
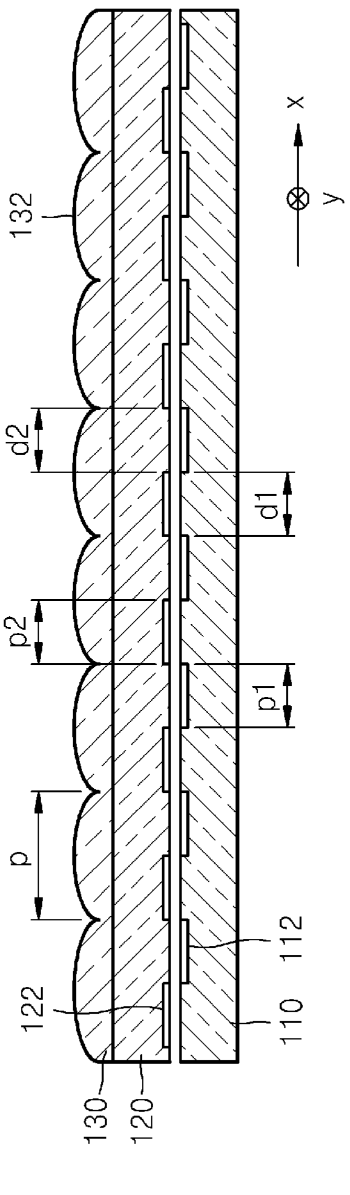
FIG. 10A is a cross-sectional view taken along line A-A of FIG. 9.

The first light guide plate 110 may include a plurality of first diffusion units 112 that diffuse light emitted from the first light source 115. FIG. 10A is a cross-sectional view taken along line A-A of FIG. 9. Referring to FIG. 10A, the first diffusion units 112 may be spaced apart from each other by a first distance d1. The first diffusion units 112 may be aligned in a widthwise direction of the backlight unit 100. In this regard, the widthwise direction (x-direction) indicates a long-axis direction of the backlight unit 100 and a lengthwise direction (y-direction) indicates a short-axis direction of the backlight unit 100. The first light source 115 may be disposed at least one side of the first light guide plate 110 in the widthwise direction (x-direction). The second light source 125 may be disposed at least one side of the second light guide plate 120 in the widthwise direction (x-direction).

The first light source 115 and the second light source 125 may be a point light source, a linear light source, or a surface light source. The second light guide plate 120 may include a plurality of second diffusion units 122 that diffuse light emitted from the second light source 125. The second diffusion units 122 may be aligned to be spaced apart from each other in a widthwise direction of the backlight unit 100 by a second distance d2. The first distance d1 may be the same as the second distance d2. The first diffusion units 112 and the second diffusion units 122 may be alternately aligned.

A lenticular lens array 130 in which lenticular lenses 132 are aligned in the widthwise direction (x-direction) may be disposed on the second light guide plate 120. A pitch p of the lenticular lens 132 may be the same as or greater than the sum of a first pitch p1 of one of the first diffusion units 112 and a second pitch p2 of one of the second diffusion units 122. The lenticular lens array 130 may be separately formed or integrally formed with the second light guide plate 120.

Figure 10B:
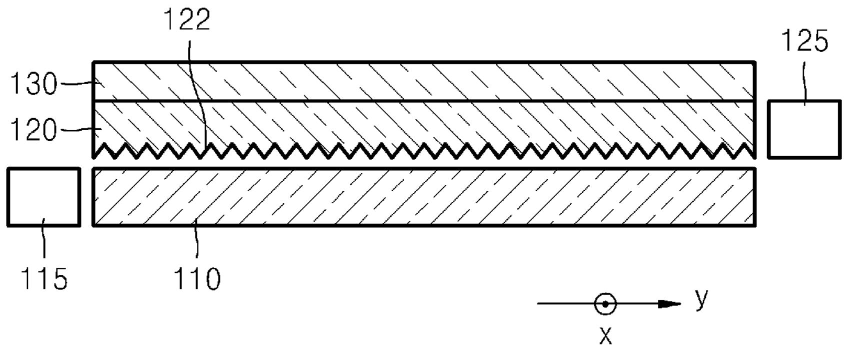
FIG. 10B is a cross-sectional view of taken along line B-B of FIG. 9.
Figure 10C:
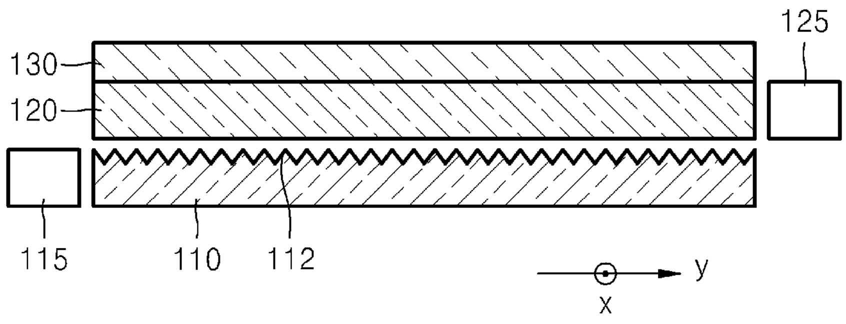
FIG. 10C is a cross-sectional view of taken along line C-C of FIG. 9.

The first diffusion units 112 and the second diffusion units 122 may include at least one selected from the group consisting of a prism pattern, a dot pattern, and a diffusion film, but are not limited thereto. The first diffusion units 112 and the second diffusion units 122 may have the same pattern. Alternatively, the first diffusion units 112 and the second diffusion units 122 may include a combination of the prism pattern, the dot pattern, and the diffusion film. FIG. 9 shows the first diffusion units 112 and the second diffusion units 122 having a prism pattern. The prism pattern may include V-shaped grooves. Referring to FIGS. 10B and 10C, if the first light source 115 and the second light source 125 are aligned at one side of the backlight unit 100 in the widthwise direction (x-direction), the V-shaped grooves of the prism pattern may be formed in the widthwise direction (x-direction) of the backlight unit 100.

When the first light source 115 is turned on and the second light source 125 is turned off, one part of light emitted from the first light source 115 is diffused in the first diffusion units 112 of the first light guide plate 110 and emitted via the second light guide plate 120 and the lenticular lens array 130. The other part of the light is reflected by a region where the first diffusion units 112 are not formed and diffused in the first diffusion unit 112 to be emitted via the second light guide plate 120 and the lenticular lens array 130.

When the first light source 115 is turned off and the second light source 125 is turned on, one part of light emitted from the second light source 125 is diffused in the second diffusion units 122 of the second light guide plate 120 and emitted via the lenticular lens array 130. The other part of the light is reflected by a region where the second diffusion unit 122 is not formed and diffused in the second diffusion units 122 to be emitted via the lenticular lens array 130.

An emission direction of light may be controlled by the first diffusion units 112, and light may be collimated by the lenticular lens array 130 to form, for example, a plurality of left-eye viewing zones. In addition, the emission direction of light may be controlled by the second diffusion units 122. Since the position of the second diffusion units 122 is different from that of the first diffusion units 112, the emission direction of light by the second diffusion units 122 may be different from that by the first diffusion units 112. For example, a plurality of right-eye viewing zones may be formed by the second diffusion units 122.

A plurality of 3D image viewing zones may be formed by the combination of the plurality of left-eye viewing zones formed by the first diffusion units 112 and the plurality of right-eye viewing zones formed by the second diffusion units 122. Also, when both of the first light source 115 and the second light source 125 are turned on, the same image is displayed in all regions, so that a 2D image may be displayed. As described above, the first light source 115 and the second light source 125 are selectively switched, so that the 2D and 3D images may be displayed and the 3D image may be displayed in the plurality of viewing zones.

Although not shown herein, a reflection plate may further be formed below the second diffusion units 122 of the backlight unit 100 shown in FIG. 9, as described above with reference to FIG. 7, and a pair of the first light sources 115 and a pair of the second light sources 125 may be disposed.

Figure 11:
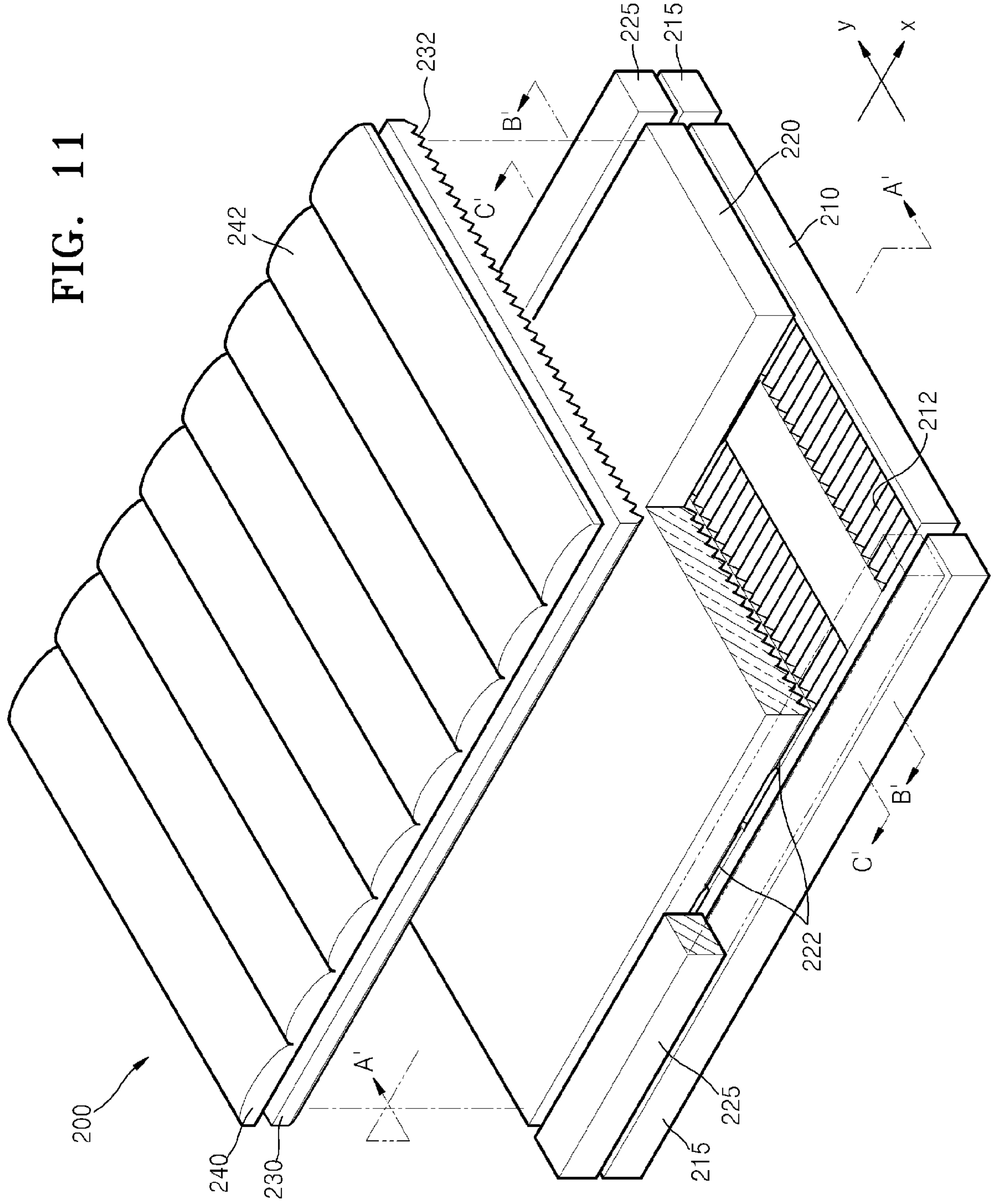
FIG. 11 is a cutaway perspective view of a backlight unit according to another exemplary embodiment.

FIG. 11 is a cutaway perspective view of a backlight unit 200 according to another exemplary embodiment. The backlight unit 200 includes a first light guide plate 210 and a second light guide plate 220, wherein a first light source 215 is disposed at least one side of the first light guide plate 210 and a second light source 225 is disposed at least one side of the second light guide plate 220.

Figure 12A:
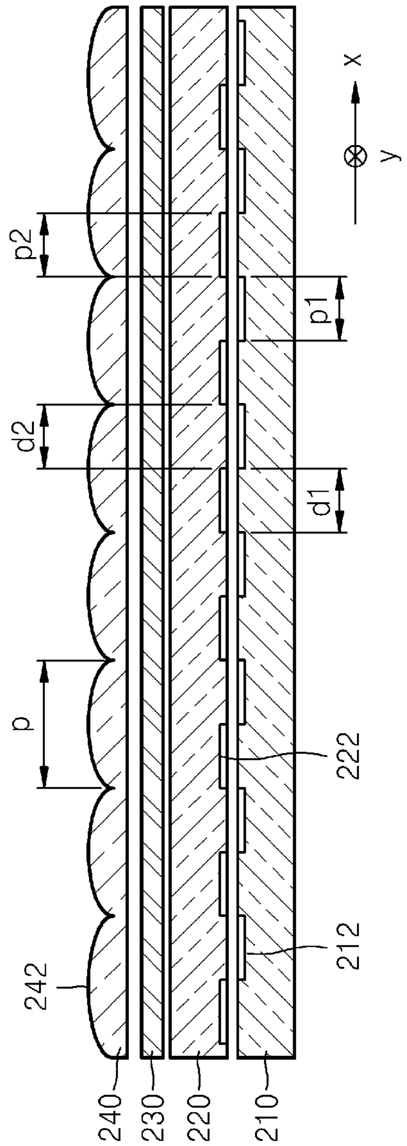
FIG. 12A is a cross-sectional view taken along line A'-A' of FIG. 11.

The first light guide plate 210 may include a plurality of first diffusion units 212 that diffuse light emitted from the first light source 215. FIG. 12A is a cross-sectional view taken along line A'-A' of FIG. 11; Referring to FIG. 12A, the first diffusion units 212 may be spaced apart from each other by a first distance d1. The first diffusion units 212 may be aligned in a widthwise direction of the backlight unit 200. In this regard, the widthwise direction (x-direction) indicates a long-axis direction of the backlight unit 200 and a lengthwise direction (y-direction) indicates a short-axis direction of the backlight unit 200. The first light source 215 may be disposed at least one side of the first light guide plate 210 in the widthwise direction (x-direction). The second light source 225 may be disposed at least one side of the second light guide plate 220 in the widthwise direction (x-direction). FIG. 11 shows a pair of first light sources 215 disposed at two opposite sides of the first light guide plate 210 and a pair of second light sources 225 disposed at two opposite sides of the second light guide plate 220.

The first light source 215 and the second light source 225 may be a point light source, a linear light source, or a surface light source. The second light guide plate 220 may include a plurality of second diffusion units 222 that diffuse light emitted from the second light source 225. The second diffusion units 222 may be aligned to be spaced apart from each other in a widthwise direction of the backlight unit 200 by a second distance d2. The first distance d1 may be the same as the second distance d2. The first diffusion units 212 and the second diffusion units 222 may be alternately aligned.

A lenticular lens array 240 in which lenticular lenses 242 are aligned in the widthwise direction (x-direction) may be disposed on the second light guide plate 220. A pitch p of the lenticular lens 242 may be the same as or greater than the sum of a first pitch p1 of one of the first diffusion units 212 and a second pitch p2 of one of the second diffusion units 222. A brightness enhancement film 230 may further be disposed between the second light guide plate 220 and the lenticular lens array 240. The brightness enhancement film 230 may include a prism pattern 232 formed in the widthwise direction (x-direction) of the backlight unit 200. The brightness enhancement film 230 diffuses an incident light in the lengthwise direction (y-direction) to widen a viewing angle in the lengthwise direction. The lenticular lens array 240 may be separately formed or integrally formed with the brightness enhancement film 230.

Figure 12B:
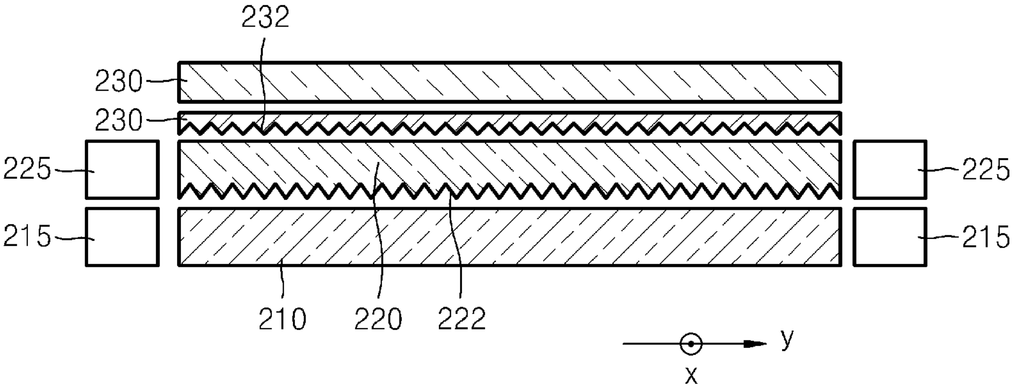
FIG. 12B is a cross-sectional view of taken along line B'-B' of FIG. 11.
Figure 12C:
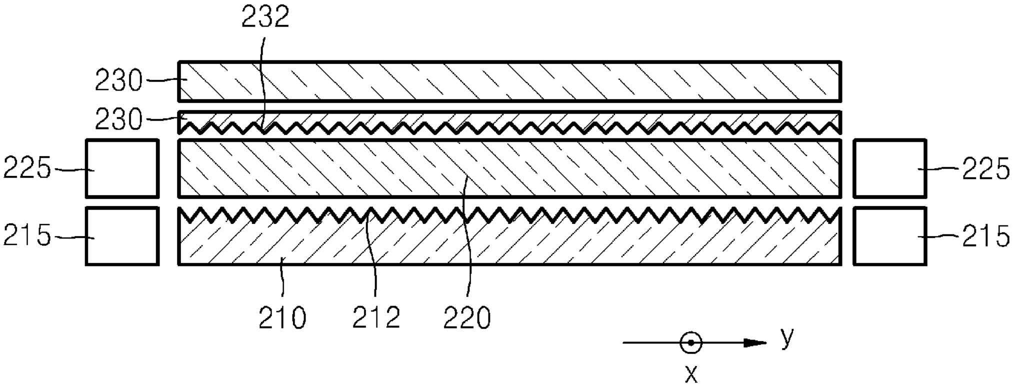
FIG. 12C is a cross-sectional view of taken along line C'-C' of FIG. 11.

The first diffusion units 212 and the second diffusion units 222 may include a prism pattern, a dot pattern, or a diffusion film, but are not limited thereto. The first diffusion units 212 and the second diffusion units 222 may have the same pattern. Alternatively, the first diffusion units 212 and the second diffusion units 222 may include a combination of the prism pattern, the dot pattern, and the diffusion film. FIG. 11 shows the first diffusion units 212 and the second diffusion units 222 having a prism pattern. The prism pattern may include V-shaped grooves. Referring to FIGS. 12B and 12C, if the first light source 215 and the second light source 225 are aligned at the sides of the backlight unit 200 in the widthwise direction (x-direction), the V-shaped grooves of the prism pattern may be formed in the widthwise direction (x-direction) of the backlight unit 200.

When the first light source 215 is turned on and the second light source 225 is turned off, one part of light emitted from the first light source 215 is diffused in the first diffusion units 212 of the first light guide plate 210 and emitted via the second light guide plate 220, the brightness enhancement film 230, and the lenticular lens array 240. The other part of the light is reflected by a region where the first diffusion units 212 are not formed and diffused in the first diffusion units 212 to be emitted via the second light guide plate 220, the brightness enhancement film 230, and the lenticular lens array 240.

When the first light source 215 is turned off and the second light source 225 is turned on, one part of light emitted from the second light source 225 is diffused in the second diffusion units 222 of the second light guide plate 220 and emitted via the brightness enhancement film 230 and the lenticular lens array 240. The other part of the light is reflected by a region where the second diffusion unit 222 is not formed and diffused in the second diffusion unit 222 to be emitted via the brightness enhancement film 230 and the lenticular lens array 240.

An emission direction of light may be controlled by the first diffusion units 212, and light may be collimated by the lenticular lens array 240 to form, for example, a plurality of left-eye viewing zones. In addition, the emission direction of light may be controlled by the second diffusion units 222. Since the position of the second diffusion units 222 is different from that of the first diffusion units 212, the emission direction of light by the second diffusion units 222 may be different from that by the first diffusion units 212. For example, a plurality of right-eye viewing zones may be formed by the second diffusion units 222. In addition, the viewing angle in the lengthwise direction may be widened by the brightness enhancement film 230.

A plurality of 3D image viewing zones may be formed by the combination of the plurality of left-eye viewing zones formed by the first diffusion units 212 and the plurality of right-eye viewing zones formed by the second diffusion units 222. Also, when both of the first light source 215 and the second light source 225 are turned on, the same image is displayed in all regions, so that a 2D image may be displayed. As described above, since the first light source 215 and the second light source 225 are selectively switched, the 2D and 3D images may be displayed. Since the 3D image may be displayed in the plurality of viewing zones, many people may watch the 3D image.

Figure 13:
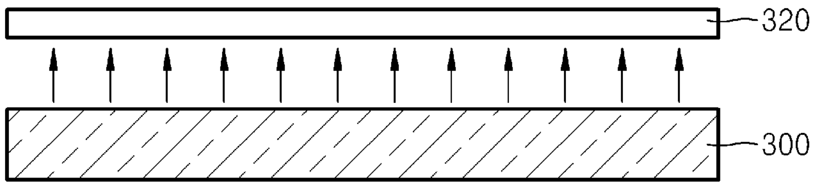
FIG. 13 schematically illustrates a 2D and 3D image display system including a backlight unit according to an exemplary embodiment.

FIG. 13 schematically illustrates a 2D and 3D image display system including a backlight unit 300 according to an exemplary embodiment. The 2D and 3D image display system includes a backlight unit 300 and a display panel 320 that is formed on the backlight unit 300 to form an image. The backlight unit 300 may be any of the backlight units 1, 100, and 200 described above.

The display panel 320 may include a liquid crystal panel. The liquid crystal panel includes pixels, each of which includes a thin-film transistor and electrodes, and displays an image by applying electric fields to the liquid crystal. The configuration of the liquid crystal panel and operations of displaying images by driving circuits are well known in the art, and thus descriptions thereof will be omitted herein.

While exemplary embodiments have been particularly shown and described, it will be understood by those of ordinary skill in the art that various changes in form and details may be made therein without departing from the spirit and scope of the inventive concept as defined by the following claims.

What is claimed is:

1. A backlight unit comprising:

a first light guide plate;

a first light source that is disposed at one side of the first light guide plate and emits light to the first light guide plate;

a second light guide plate that is disposed on the first light guide plate;

a second light source that is disposed at one side of the second light guide plate and emits light to the second light guide plate;

a plurality of first diffusion units that are aligned in the first light guide plate to be spaced apart from each other in a widthwise direction of the first light guide plate;

a first region in that the first diffusion units are not aligned between the plurality of first diffusion units;

a plurality of second diffusion units that are aligned in the second light guide plate alternately with the first diffusion units in a widthwise direction of the second light guide plate;

a second region in that the second diffusion units are not aligned between the plurality of second diffusion units; and a lenticular lens array that is disposed on the second light guide plate, wherein a sum of a pitch of one of the first diffusion units and a pitch of the second diffusion units is the same as a pitch of the lenticular lens array.

2. The backlight unit of claim 1, wherein each of the first diffusion units and the second diffusion units comprises one selected from the group consisting of a prism pattern, a diffusion film, and a dot pattern.

3. The backlight unit of claim 1, wherein the first light source is disposed at one side of the first light guide plate in a lengthwise direction of the first light guide plate, and the second light source is disposed at one side of the second light guide plate in a lengthwise direction of the second light guide plate.

4. The backlight unit of claim 3, wherein the first diffusion units and the second diffusion units have a prism pattern aligned in the lengthwise direction of the first and second light guide plates.

5. The backlight unit of claim 3, wherein the first light source and the second light source are respectively driven in synchronization with a left-eye image signal and a right-eye image signal.

6. The backlight unit of claim 1, wherein the first light source is disposed at the side of the first light guide plate in the widthwise direction of the first light guide plate, and the second light source is disposed at the one side of the second light guide plate in the widthwise direction of the second light guide plate.

7. The backlight unit of claim 6, wherein the first diffusion units and the second diffusion units have a prism pattern aligned in the widthwise directions of the first and second light guide plates.

8. The backlight unit of claim 1, further comprising a switch controller that selectively switches the first light source and the second light source.

9. The backlight unit of claim 1, wherein a reflection plate is further disposed below the second diffusion units.

10. The backlight unit of claim 1, wherein a medium that has a refractive index less than that of the first light guide plate and the second light guide plate is interposed between the first light guide plate and the second light guide plate.

11. The backlight unit of claim 1, wherein the lenticular lens array and the second light guide plate are integrally formed.

12. The backlight unit of claim 1, further comprising a brightness enhancement film disposed between the second light guide plate and the lenticular lens array to diffuse light in a lengthwise direction of the second light guide plate.

13. The backlight unit of claim 1, wherein the plurality of first diffusion units are configured to emit light to form a plurality of left-eye viewing zones, the plurality of second diffusion units are configured to emit light to form a plurality of right-eye viewing zones, and the plurality of left-eye viewing zones and the plurality of right-eye viewing zones are alternately arranged to form a plurality of 3D image viewing zones.

14. A two-dimensional (2D) and three-dimensional (3D) image display system comprising a backlight unit and a display panel that forms an image using light emitted from the backlight unit, wherein the backlight unit comprises:

a first light guide plate;

a first light source that is disposed at one side of the first light guide plate and emits light to the first light guide plate;

a second light guide plate that is disposed on the first light guide plate;

a second light source that is disposed at one side of the second light guide plate and emits light to the second light guide plate;

a plurality of first diffusion units that are aligned in the first light guide plate to be spaced apart from each other in a widthwise direction of the first light guide plate;

a first region in that the first diffusion units are not aligned between the plurality of first diffusion units;

a plurality of second diffusion units that are aligned in the second light guide plate alternately with the first diffusion units in a widthwise direction of the second light guide plate; and a second region in that the second diffusion units are not aligned between the plurality of second diffusion units, wherein a sum of a pitch of one of the first diffusion units and a pitch of the second diffusion units is the same as a pitch of the lenticular lens array.

15. The 2D and 3D image display system of claim 14, wherein each of the first diffusion units and the second diffusion units comprises one selected from the group consisting of a prism pattern, a diffusion film, and a dot pattern.

16. The 2D and 3D image display system of claim 14, wherein the first light source is disposed at the side of the first light guide plate in the lengthwise direction of the first light guide plate, and the second light source is disposed at the side of the second light guide plate in the lengthwise direction of the second light guide plate.

17. The 2D and 3D image display system of claim 16, wherein the first diffusion units and the second diffusion units have a prism pattern aligned in the lengthwise direction of the first and second light guide plates.

18. The 2D and 3D image display system of claim 16, wherein the first light source and the second light source are respectively driven in synchronization with a left-eye image signal and a right-eye image signal.

19. The 2D and 3D image display system of claim 14, wherein the first light source is disposed at the one side of the first light guide plate in the widthwise direction of the first light guide plate, and the second light source is disposed at the one side of the second light guide plate in the widthwise direction of the second light guide plate.

20. The 2D and 3D image display system of claim 19, wherein the first diffusion units and the second diffusion units have a prism pattern aligned in the widthwise direction of the first and second light guide plates.

21. A backlight unit comprising:

a first light guide plate having a plurality of first diffusion units formed thereon in a first direction and spaced apart from each other and a first region in that the first diffusion units are not formed between the plurality of first diffusion units;

a first light source that is disposed at one side of the first light guide plate and emits light to the first light guide plate;

a second light guide plate having a plurality of second diffusion units formed thereon and a second region in that the second diffusion units are not formed between the plurality of second diffusion units, the second diffusion units spaced apart from each other and alternately aligned with the plurality of first diffusion units in the first direction, the second light guide plate being disposed on the first light guide plate;

a second light source that is disposed at one side of the second light guide plate and emits light to the second light guide plate; and a lenticular lens array that is disposed on the second light guide plate, wherein a sum of a pitch of one of the first diffusion units and a pitch of the second diffusion units is the same as a pitch of the lenticular lens array.

22. The backlight unit of claim 21, wherein the plurality of first diffusion units and the plurality of second diffusion units respectively comprise one selected from the group consisting of a prism pattern, a diffusion film, and a dot pattern.

23. The backlight unit of claim 21, wherein the first light source is disposed at the one side of the first light guide plate in a second direction perpendicular to the first direction, and the second light source is disposed at the one side of the second light guide plate in the second direction.

24. The backlight unit of claim 21, wherein the first light source is disposed at the one side of the first light guide plate in the first direction perpendicular to a second direction, and the second light source is disposed at the one side of the second light guide plate in the first direction.

* * * * *